(12) United States Patent
Sehmer et al.

(10) Patent No.: US 9,563,795 B2
(45) Date of Patent: Feb. 7, 2017

(54) RADIO FREQUENCY IDENTIFICATION SYSTEM

(71) Applicants: Mark Sehmer, Stoughton, WI (US); Mike Lohmeier, Sun Prairie, WI (US); Travis Phillips, Stoughton, WI (US)

(72) Inventors: Mark Sehmer, Stoughton, WI (US); Mike Lohmeier, Sun Prairie, WI (US); Travis Phillips, Stoughton, WI (US)

( * ) Notice: Subject to any disclaimer, the term of this patent is extended or adjusted under 35 U.S.C. 154(b) by 325 days.

(21) Appl. No.: 13/800,847

(22) Filed: Mar. 13, 2013

(65) Prior Publication Data

US 2014/0266613 A1 Sep. 18, 2014

(51) Int. Cl.
*H04Q 5/22* (2006.01)
*G06K 7/10* (2006.01)

(52) U.S. Cl.
CPC .................. *G06K 7/10366* (2013.01)

(58) Field of Classification Search
None
See application file for complete search history.

(56) References Cited

U.S. PATENT DOCUMENTS

| | | | | |
|---|---|---|---|---|
| 8,502,672 B1* | 8/2013 | Crossno | ................. | G06Q 10/00 340/572.1 |
| 2006/0161878 A1 | 7/2006 | Koh | | |
| 2006/0226981 A1 | 10/2006 | Gregersen | | |
| 2008/0001709 A1* | 1/2008 | Venkatesh et al. | .......... | 340/10.1 |
| 2008/0160984 A1 | 7/2008 | Benes | | |
| 2008/0165007 A1* | 7/2008 | Drago et al. | ............... | 340/572.1 |
| 2008/0320306 A1 | 12/2008 | Yamamura | | |
| 2009/0171999 A1* | 7/2009 | McColl | ............. | G06F 17/30539 |
| 2010/0052909 A1 | 3/2010 | Doan | | |
| 2011/0154447 A1* | 6/2011 | Dennis et al. | ..................... | 726/4 |
| 2011/0169617 A1* | 7/2011 | Spindel | ................ | G06K 7/0008 340/10.32 |
| 2012/0075067 A1* | 3/2012 | Attaluri | .................... | H04Q 9/00 340/10.1 |

(Continued)

FOREIGN PATENT DOCUMENTS

WO    WO2012126977 A2    3/2012

OTHER PUBLICATIONS

PCT, Notification of Transmittal of the International Search Report and the Written Opinion of the International Searching Authority, or the Declaration, in International application No. PCT/US2014/010775 (12 pages).

(Continued)

*Primary Examiner* — Curtis King
(74) *Attorney, Agent, or Firm* — McAndrews, Held & Malloy, Ltd.

(57) ABSTRACT

A multi-tenant, RFID system that may be Cloud based or run on a local area network (LAN) for distributed RFID devices and RFID applications. The RFID system a central abstraction and translation layer between RFID devices installed in geographically diverse locations and applications. RFID devices initiate communication to a Cloud or LAN network over to send events and receive commands. RFID applications can receive RFID tag data, device health, and requested and derived events from the RFID system to automatically run processes based on the provided data. Applications manage RFID devices and settings in the RFID system using command and configuration interfaces.

27 Claims, 4 Drawing Sheets

(56) References Cited

U.S. PATENT DOCUMENTS

| | | | |
|---|---|---|---|
| 2012/0310707 A1* | 12/2012 | Naphade | G06F 17/30241 705/7.31 |
| 2013/0176115 A1* | 7/2013 | Puleston et al. | 340/10.51 |
| 2013/0219280 A1* | 8/2013 | Weinstein | H04L 67/14 715/736 |
| 2013/0222107 A1* | 8/2013 | Herscovitch | G05B 1/01 340/5.6 |
| 2014/0075572 A1* | 3/2014 | Mehring | G06F 21/6218 726/28 |
| 2014/0159872 A1* | 6/2014 | Bekritsky | G06K 7/10079 340/10.5 |
| 2014/0266613 A1* | 9/2014 | Sehmer | G06K 7/10366 340/10.1 |
| 2015/0046237 A1* | 2/2015 | Slonimsky | 705/14.16 |
| 2015/0168533 A1* | 6/2015 | Chang | G01S 1/68 340/10.1 |

OTHER PUBLICATIONS

PCT, Notification Concerning Transmittal of International Preliminary Report on Patentability, in International application No. PCT/US2014/010775 dated Sep. 24, 2015. (7 pages).

European Patent Office, Communication with extended European search report in Application No. 14773075.8 dated Oct. 5, 2016 (6 pages).

\* cited by examiner

RADIO FREQUENCY IDENTIFICATION SYSTEM

BACKGROUND OF THE INVENTION

Radio frequency identification (RFID) device implementation projects for the enterprise level may be highly complex and require relatively major shifts in processes and procedures enterprise wide. Typically, RFID devices are installed throughout an enterprise for tracking a variety of items, products and people. Further, RFID devices may be used by an enterprise throughout the distribution system, and potentially into the point of use/consumption. Examples of RFID devices include fixed readers, label printers, handheld readers, and cell phones, among others, that have an antenna designed to emit a radio frequency that allows for reading information on RFID tags. These RFID devices may also include other, optional accessories, such as, for example, barcode readers or keypads that may capture additional data when a reads of an RFID tag occurs.

The enterprise, such as, for example, the information technology department of the enterprise, is often tasked with figuring out how to get hundreds to thousands of RFID devices to communicate regionally, if not globally, to a central location, such as, for example, the headquarters of the enterprise. However, this process may be one of the more expensive aspects of deploying an RFID solution. In some uses, the RFID hardware may use a Low Level Reader Protocol (LLRP) to communicate RFID tag information. However, not all RFID devices may support LLRP. Thus, RFID systems may require the use of middleware software that assists in allowing the RFID device to communicate with the software of the RFID system. However, the need for such middleware software, which may be purchased or built, for the RFID system may increase the cost, maintenance and/or complexity of the RFID system.

Additionally, RFID systems typically require a hardware and networking infrastructure that allows the RFID devices to be able to communicate with business application servers. For example, RFID systems that receive information or data from RFID devices that may need to be accessible so that the data contained therein may be acted upon by the business applications, such as, for example, in an enterprise resource planning (ERP) system. Thus, developers of RFID systems may be tasked with not only figuring out how to handle the desired RFID data, but also other events and processes involving the RFID data. Additionally, developers of such RFID systems may need to account for a variety of other issues, such as, for example, management of remote firmware, RFID device health, and the health of any peripherals connected to the RFID device. Further, business processes throughout an organization that utilize the RFID system may need to be, concurrently, updated for the new tracking ability that new, updated or modified software may provide. The infrastructure for an RFID system may also need to be built in conjunction with the associated business software that utilizes data obtained by, or communicated through the use of, the RFID system, which may introduce another cost and/or delay point. In view of the foregoing, projects to implement RFID systems often never get off the ground due to the time and monetary investment in pure infrastructure costs.

RFID devices currently typically have an application programming interface (API) that is only useful for local area network (LAN) segments. Thus, a local server connects to the RFID device via the API and then manages the functions of the RFID device, such as, for example, RFID scans, reboots of the RFID device, the health of the RFID device, and, potentially, firmware upgrades. However, the API cannot be accessed over the Internet. Some RFID devices may have their own API that is either based on a proprietary protocol or an open source standard such as LLRP. Such protocols, however, are typically designed for LAN communications only.

A typical setup of an RFID system has a server on the same LAN network as the RFID device(s). The server may connect to the RFID device(s) and then control their functionality. Control of the RFID device by the server is typically done over a specific transmission control protocol (TCP) port, such as, for example, TCP port number 5084 for LLRP. However, if a server needs to connect to an RFID device(s) that is on a different LAN network, then either a virtual private network (VPN) is required to bridge the different networks or a route over the internet with a firewall forwarding rule needs to be in place to make the connection between the different servers.

Other RFID devices are dependent on being connected to a computer to operate or are built into a computer, such as, for example, a handheld barcode scanner. In these instances, the server may connect to the computer, or the computer may be pushing data to the server. However, if the server needs to connect to the computer, the same problems exist for communications across different networks.

BRIEF SUMMARY OF THE INVENTION

Certain embodiments of the present technology provide a radio frequency identification system that includes one or more radio frequency identification devices, one or more endpoint applications, and a network. The network includes a runtime system, a plurality of web servers, and a Cloud application. The runtime system further includes an application protocol interface that is configured to facilitate communications between the one or more endpoint applications and the network. The network also includes a device application protocol interface that is configured to facilitate communications over the internet between the plurality of web servers and the one or more radio frequency identification devices. Further, the application is configured to create a tenancy on the runtime system for the one or more endpoint applications.

Additionally, certain embodiments of the present technology provide a method for operating a radio frequency identification system that includes delivering a command from an endpoint application to a runtime system through an application protocol interface of the runtime system. The method also includes identifying a radio frequency identification device associated with the command and delivering the command from the runtime system to a server that communicates with an agent of the radio identification frequency device. Further, the method includes queuing in a queue the command delivered to the server and polling, by the agent of the radio frequency identification device, the queue for the command. The method also includes delivering the command from the queue to the agent of the radio frequency identification device.

Figure 1A:
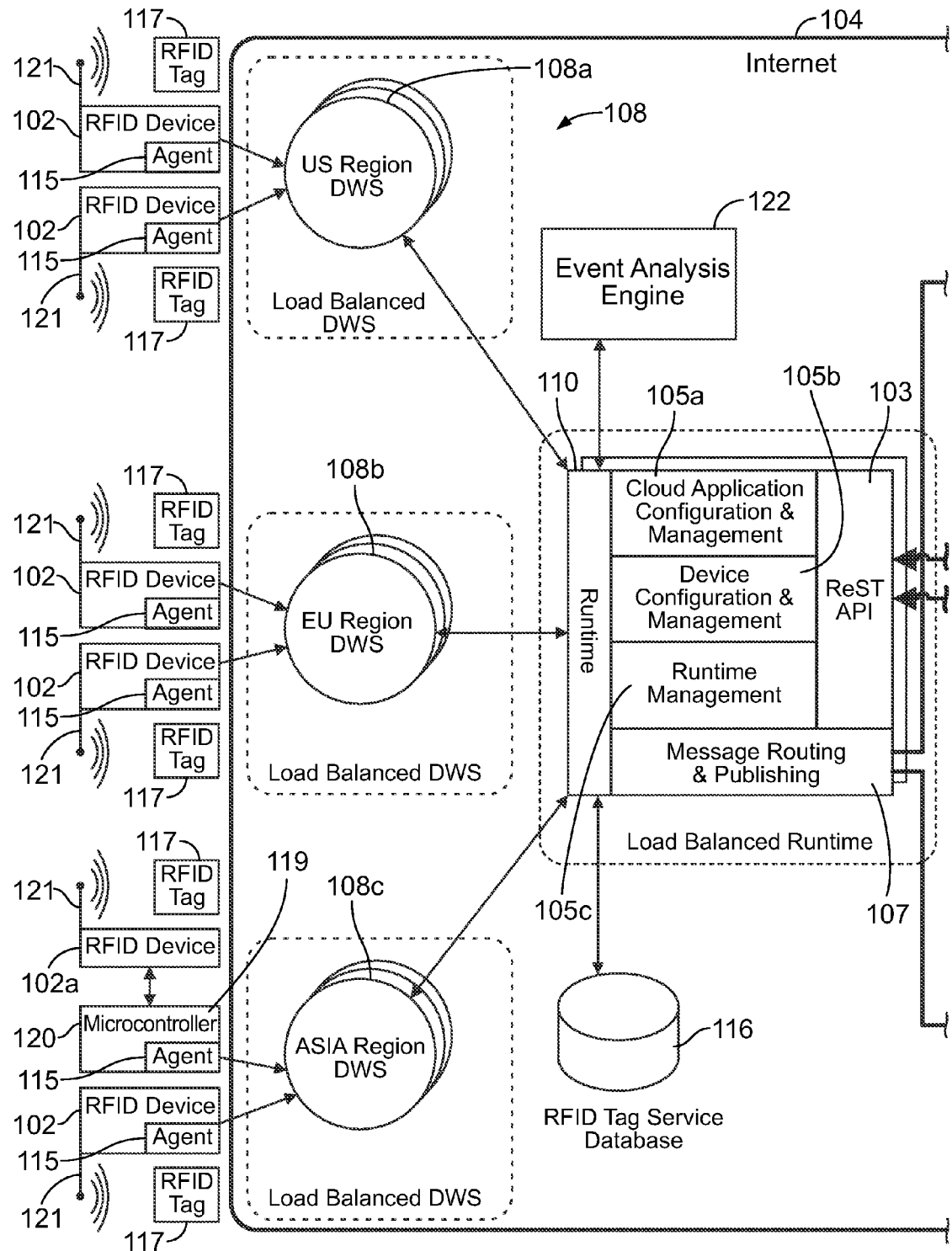
FIG. 1, broken into FIG. 1A and FIG. 1B in the drawing sheets, illustrates an RFID system according to embodiments of the present invention.

The foregoing summary, as well as the following detailed description of certain embodiments, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

The present invention will now be described more fully with reference to the accompanying drawings. This invention may, however, be embodied in many different forms and should not be construed as limited to the embodiments set forth here. Rather, these certain embodiments are examples of the invention, which has the full scope indicated by the language of the claims. Like numbers refer to like elements throughout.

Figure 1B:
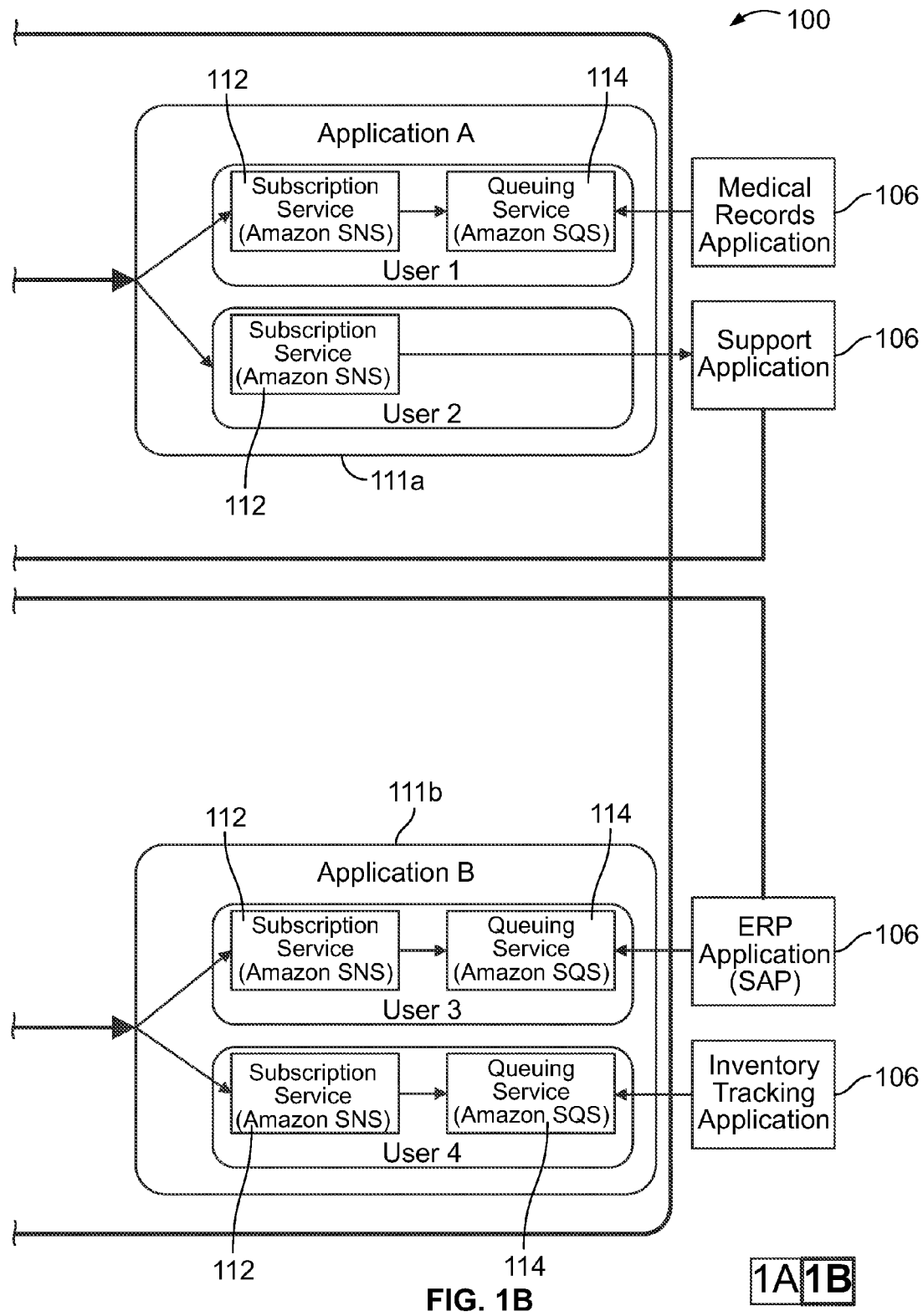

FIG. 1 illustrates an RFID system 100 according to certain embodiments of the present invention. As shown, the RFID system 100 includes one or more RFID devices 102 a Cloud network 104 and one or more endpoint applications 106. As discussed below, each RFID device 102 may include, or be operated with, a local agent 115. The RFID device 102 may include an antenna 121, for example, that allows the RFID device 102 to communicate with an RFID tag 117. The RFID system 100 may be configured to provide an open Cloud device API and a Cloud application API 103 that is based in an application that is hosted on or run on the Cloud network 104. Use of the Cloud network 104 by the RFID system 100 may eliminate hardware and networking infrastructure constraints so as to allow RFID devices 102 to be able to communicate with an endpoint application 106, such as, for example, a business application. In fact, according to certain embodiments, the Cloud application API 103 may use standard API calls to perform a variety of tasks, such as, for example, query or set RFID data, query RFID device health or control RFID devices, regardless of hardware of the system 100.

Messages between the RFID device 102 and the Cloud network 104, the endpoint application 106 and the Cloud network 104, and/or within the Cloud network 104 may be done in context of a Cloud application 111a, 111b. A runtime system 110 of the Cloud network 104 may receive a message from a device web server (DWS) 108, and then determines which Cloud application 111a, 111b the RFID device 102, and moreover the information in the communication from the RFID device 102, is associated. Communications may then be published to all of the users of the Cloud application 111a, 111b and/or placed in the queue provided by the queuing service 114. Similarly, commands received via the Cloud application API 103 for an RFID device 102 are routed through the correct interface to the appropriate DWS 108, such as, in the illustrated embodiment, the regional DWS 108a, 108b, 108c that is communicating with the RFID device 102.

Data received from the RFID device 102 may be published, such as, for example, via a message routing and publishing application 107 of a runtime system 110 provides data for the Cloud application 111a, 111b. The particular Cloud application 111a, 111b that receives the data may depend on the content of the data and/or the RFID device 102 from which the data originated. More specifically, the Cloud application 111a, 111b may be associated with different endpoint applications 106 that subscribe to, or seek, particular types of data or data from particular RFID devices 102. Further, as illustrated by FIG. 1, the data delivered to the Cloud application 111a, 111b may be further filtered so that particular information may be delivered to some, but not all, endpoint applications 106 associated with the particular Cloud application 111b. As discussed below, the data received by the Cloud application 111a, 111b may be either directly delivered to an associated endpoint application 106 or into a queue of a queuing service 114 that the endpoint application 106 can use to either access or consume the returned data when needed.

The local agent 115 for the RFID device 102 may manage a number of functions of the RFID device 102, including, for example, RFID reading, health reporting and firmware management, among other tasks. Further, the agent 115 is configured to push data from the RFID device 102 to the Cloud network 104. Thus, while according to certain embodiments the agent 115 may also be configured to provide data in response to requests received from a server of the Cloud network 104, such as, for example, DWS 108, the agent 115 provides the ability for data on the RFID device 102 to be pushed onto the Cloud network 104 without a request for the data from the Cloud network 104 or endpoint application 106 or other segment of the RFID system 100. Thus, the need for infrastructure, such as a VPN connection, typically used to establish a connection with a remote server at a satellite location and an RFID device 102 is not required. The RFID system 100 offers features to withstand intermittent component outages. When an endpoint application 106 seeks to obtain information regarding an RFID device 102 at a satellite location, such as, for example, a supplier seeking information regarding a product stored on consignment at a end-user's facility, the current information that is provided by the RFID device 102 may already be available on the network. Therefore, in response to the endpoint application 106 of the supplier seeking information provided by the RFID device 102, the supplier's server is not required to establish a connection with the RFID device 102 through the end user's network or send an information request to the RFID device 102 through that connection. Instead, information available from the RFID device 102 may already have been pushed by the agent 115 onto the Cloud network 104. Additionally, the use of the agent 115 to push information onto the Cloud allows the system 100 to not need a remote server, such as, for example, the supplier's server, to control the RFID device 102, as the local agent 115 for the RFID device 102 handles such work.

The agent 115 may be a piece of software that runs directly on the RFID device 102. Alternatively, in the event the RFID device 102a does not include a microcontroller, an external processor device 119 having a microprocessor 120 with logic where the agent 115 can run is needed, such as, for example, a controlling computer or networked appliance. Further, the agent 115 is the interfacing software that acts as the exchange between the API of the RFID device 102 and the open Cloud device API that may reside at the DWS 108. Tasks for which the agent 115 may be responsible for include, but are not limited to: responding to device firmware and/or software updates and controls; generating a regularly scheduled message indicating the health of the RFID device 102; controlling configuration settings of the RFID device 102 and RFID reads; responding to configuration changes, such as, for example, RFID scan durations, RF power level, and RFID tag 117 reading sensitivity, among others; controlling when RFID scans occur, what settings are used, and the duration of RFID scans; providing feedback when RFID reads are occurring or if the RFID device 102 is experiencing a hardware problem; generating messages when error conditions occur; queuing messages if an internet connection is not available; security authentication with the Cloud network 104; managing device time; and handling custom RFID device 102 specific commands and data.

According to certain embodiments, the agent 115 may communicate, through an internet connection, with a DWS 108 of the Cloud network 104. The RFID device 102 and/or agent 115 may be configured to initiate the connection outbound from the network that the RFID device 102 is connected to a particular DWS 108. For example, FIG. 1 illustrates three different DWSs 108 that an RFID device 102 may communicate with, such as, for example, a United States (US) Region DWS 108a, European Union (EU) DWS 108b and an Asia Region DWS 108c. As indicated by their names, according to certain embodiments, the particular DWS 108 that the RFID device 102 communicates with may be based on the location of the RFID device 102 and the DWS 108. However, different criteria may be used to determine which DWS 108 the RFID communicates with, such as, for example, the type of product or end user of the product associated with the RFID device 102, among other types of criteria.

Communication from, or between, the RFID device 102 and the DWS 108 may occur over a Secure Sockets Layer (SSL) connection using a ReST command(s). According to certain embodiments, this communication is an HTTPS POST from the RFID device 102 to the DWS 108. Additionally, according to certain embodiments, to further augment the supply of data from the RFID device 102 to the DWS 108, a SOAP message or another proprietary messaging structure could be used to encapsulate the data. Further, according to certain embodiments, messages between the RFID device 102 and the DWS 108 may be in XML format.

According to certain embodiments, to enhance security, each agent 115 is configured with an access key registered in the RFID system 100, such as, for example, by the DWS 108. If the access key the agent 115 is reporting does not match the access key for that RFID device 102 and/or an access key registered by the RFID system 100, the communication from the agent 115 will be flagged as an error, which may result in the DWS 108 rejecting or ignoring the communication from the agent 115. Further, according to certain embodiments, a return communication may be sent to the RFID device 102, such as, for example, as an HTTP Error 401 with a message indicating that the access key provided by the agent 115 is invalid. This combination of an access key and the return message, such as the HTTP error message, provides security for messages being sent to the Cloud network 104 across the internet, as well as security for the Cloud and endpoint application 111a, 111b, 106 that prevents spoofing or other malicious intent. Additionally, the receipt of the error by the agent 115 of the RFID device 102 may afford the agent 115 the opportunity to react to the message, such as by resending the access key or analyzing the access key being used.

The DWS 108 may be configured to be a relatively fast responding endpoint for communications, including communications providing data, to/from RFID devices 102. Therefore, according to certain embodiments, each DWS 108a, 108b, 108c may be multiple servers load balanced for optimal performance. Such load balancing may allow for maintenance on one or more DWSs 108 while other DWSs 108 handle the work load. Additionally, the system 100 may be configured to provide multiple DWS 108a, 108b, 108c availability zones that allows for failover if interruptions in network 104 connectively or other issues prevent one or more zones from being available. Thus, if an RFID device 102 is unable to connect with a DWS 108 in a particular territory, such as, for example, the US Region DWS 108a, communications to/from the RFID device 102 may be routed to another DWS 108, such as, for example, the EU Region DWS 108b. Further, the system 100 may also include a DNS load balancer for these multiple DWS 108a, 108b, 108c availability zones, such as the US Region DWS 108a, EU DWS 108b, and the Asia Region DWS 108c that provides one end point that agents 115 may connect to without the worry of managing failover and redundancy. Further, as previously discussed, the multiple DWS 108a, 108b, 108c zones may be set up regionally across the globe to allow RFID devices 102 to communicate with a DWS 108a, 108b, 108c that are is the same region as the RFID device 102, which may improve latency in network communications. Additionally, multiple RFID devices 102 may communicate with the DWS 108 at the same time, thereby allowing multiple messages to be sent to and/or received by the DWS 108 so as to improve the speed and efficiency of the system 100.

According to certain embodiments, when an RFID device 102 sends a communication to a DWS 108, and, if available, security is validated, the Cloud network 104 may return an acknowledgement to the RFID device 102 of successful receipt. For example acknowledgement of a successful receipt of a communication may be sent to the RFID device 102 by issuing a HTTP 200 with an optional message, such as, for example, an acknowledgment message, an indication that the RFID device 102 is not recognized, or to validate communications between the DWS 108 and the RFID device 102, among other messages. Once the RFID device 102, and more specifically the agent 115 of the RFID device, receives the acknowledgement, the agent 115 may proceed to remove the communication that was sent by the agent 115 of the RFID device 102 to the DWS 108 from the memory or queue of the RFID device 102 and proceed to send the next message, if there is one. According to certain embodiments, the above process may be repeated for each message. Alternatively, once the initial acknowledgment during a session of communication between the RFID device 102, and moreover its agent 115, and the Cloud network 104 is received, the agent 115 may communicate all remaining information or data that is ready to be communicated, such as, for example, by the SSL connection remaining open. As acknowledgements are received, the agent 115 of the RFID device 102 may then remove the sent messages from the RFID device 102. Once the agent 115 has finished sending messages and/or receiving acknowledgments, the SSL connection may be terminated or torn down.

The DWS 108 may also include a queue of commands that are to be delivered to the RFID device 102. When a RFID device 102 connects to a DWS 108 to communicate information to the DWS 108, the DWS 108 may inform the RFID device 102 that there are commands that the RFID device 102 needs to process. The DWS 108 may then send, via the internet, the commands to the RFID device 102 for the RFID device 102 to act upon.

Communications received by the DWS 108 from the RFID devices 102 may be held in the DWS 108 for sending to a runtime system 110 of the Cloud network 104. In the event the runtime system 110 is unavailable, each DWS 108*a*, 108*b*, 108*c* may include a queue that holds the communications. The runtime system 110 may include software that is configured to control elements of the runtime system 110, such as, for example, application configuration and management 105*a*, which may be used to determine which Cloud application 111*a*, 111*b* and/or endpoint applications 106 that are to receive particular types of data received from the RFID devices 102, and/or which RFID devices 102 are to receive particular types of messages, among other tasks. Moreover, communications from RFID devices 102 that are registered with the RFID system 100 may be delivered to all users/endpoint applications 106 who/that, under the Cloud application 111*a*, 111*b*, are to receive, or have subscribed to, communications from the RFID device 102. Data cannot transverse across Cloud applications.

Additionally, elements controlled by the runtime system 110 may include, for example, RFID device 102 configuration and management 105*b*, such as, for example, device definitions and logical devices. Further, elements controlled by the runtime system 110 may also include, for example, Runtime management 105*c*, which may include policies and overall management of the RFID system 100.

For example, as different RFID devices 102 may have different configurations, such as different settings, supported functions, and reporting abilities, among others, the application configuration and management 105*a* software of the runtime system 110 may include device definitions that are created to represent a physical device, such as a particular RFID device 102. Moreover, a new device definition is expected to be created for each RFID device 102 that the RFID system 100 may support. Thus, the runtime system 110 uses device definitions to validate a command(s), or request(s), that is/are being issued to the RFID device 102, so as to, for example, validate that the command(s) is/are compatible with the configuration of the RFID device 102. Such validation also allows for feedback to the user and/or the endpoint application 106 relatively quickly in the event a command originating from the endpoint application 106 or runtime system 110 is invalid or non-compatible with the RFID device 102 that is the intended recipient of the command. Commands that may be validated by the runtime system 110 based on device definitions include, but is not limited to: RFID functions, such as, for example, kill tags, lock tags, unlock tags, write tag data, and read tag data; system functions, such as, for example, reboot, update firmware/software; configuration parameters, including, for example, name of supported parameters that can be get/set remotely as well as their type, such as bool, int, and double, among others; device specific commands, such as, extension methods needed for specific functions to be controlled remotely outside of the standard RFID system 100 offering; and sensor controls, including, for example, a list of sensors each RFID device 102 may have along with the associated unit of measure for each sensor.

Additionally, each RFID device 102 may be required to be registered with the RFID system 100. According to certain embodiments, such registration may require a digital serial number that the RFID device 102 will send in communications with the RFID system 100. This digital serial number may be sent with the access key for the RFID device 102 and the XML message payload. The RFID system 100 may then map the digital serial number to a logical device in the runtime system 110. According to certain embodiments, the digital serial number assigned to the RFID device 102 may be permanent in that the RFID device 102 does not receive a different digital serial number, thereby allowing the digital serial number to provide a unique identifier across the RFID system 100. Additionally, when the RFID device 102 is registered, it may be tied in the runtime system 110 to a specific device definition, which may allow the RFID system 100 to validate communications before communications are sent to the RFID device 102. Endpoint applications 106 may also query device configurations so that proper settings and options for communication with the RFID device 102 are displayed to the end user.

Once a RFID device 102 is configured in the runtime system 110, the settings of the RFID device 102 may be managed with a policy, such as through the Cloud application configuration and management 105*a* software, used by the runtime system 100. Multiple RFID devices 102 may share a policy so as to allow for consistent settings across those RFID devices 102, while other RFID devices 102 may have different policies. Each policy may be tied to configuration parameters associated with the device definition for the RFID device 102, thereby restricting which parameters may be configured with default values of the appropriate type for the RFID device 102 associated with the policy. However, according to certain embodiments, at least some users and/or endpoint applications 106 may have the ability to override policy settings at the time the policy is applied to the RFID device 102.

The runtime system 110 may also run a high level security object application in which RFID devices 102 may only belong to one Cloud application 111*a*, 111*b*. For example, a Cloud application 111*a*, 111*b* may be the main containing security object in the Cloud network 104 in that RFID devices 102, endpoint applications 111*a*, 111*b* and their users, and policies, among other settings, are all tied to a specific Cloud application 111*a*, 111*b*. According to certain embodiments, information inside a Cloud application 111*a*, 111*b* may not be read by another application 111*a*, 111*b*, and changes to an application 111*a*, 111*b* may be contained only to that application 111*a*, 111*b*.

Each user or their endpoint application 106 may have their own access key that is used to issue commands to the Cloud application API 103. Unlike serial numbers for RFID devices 102, security audits may require that access keys of the end user, endpoint application 106 and/or of the agent 115 of the RFID device 102 to be cycled. Security is then abstracted away from the digital serial number identifier in that the access key is used for security, while the digital serial number is used for system identification purposes. When agent 115 learns that its access key is no longer valid, it can establish a connection to the runtime 110 via the DWS 108 to acquire a new key. Security mechanisms would be put in place to only allow formerly valid agents 115 to request a new key. Potentially, for example, a time period of 24 hours could be put in place where the agent 115 would automatically qualify for a new access key without manual intervention.

The Cloud application 111*a*, 111*b* may include a publishing service, referred to as topic, that end users may subscribe to using a subscription service 112 and which the RFID system 100 utilizes to deliver messages from to the endpoint application 106 from the runtime system 110. According to certain embodiments, the subscription service 112 may utilize Amazon Simple Notification Service (SNS). However, the subscription service may take other forms, such as, for example, be an HTTP Post back or a SOAP message, among others. Additionally, a queuing service or mechanism 114, such as, for example, Amazon Simple Queue Service (SQS), Amazon Simple DB (SDB), an RSS service or Microsoft Message Queue (MS-MQ), may be configured to receive messages from the subscription service 112. This configuration allows the endpoint application 106 to have messages pushed directly into the endpoint application 106, as shown, for example by, the endpoint application 106 identified as "Support Application" in FIG. 1, or query the queue provided by the queuing service 114 for messages, as shown by the other endpoint applications 106 in FIG. 1.

The runtime system 110 is a multi-tenant platform setup to support a multitude of users and their associated endpoint applications 106. According to certain embodiments, commands issued by an endpoint applications 106 are achieved by using a ReST based web service over HTTPS. The endpoint application 106 may be required to supply its access key when making a call to the Cloud application API 103. Calls from the endpoint application 106 that have an invalid access key may be returned as an Error 401, indicating the access key is invalid.

The Cloud application API 103 provides a standard interface for issuing commands to RFID devices 102 regardless of RFID devices 102 manufacturer. Examples of RFID device 102 commands include, but are not limited to: DeviceSpecificCommand, which issues a command that is unique to a particular RFID devices 102; ResetCommand, which issues a command requesting the RFID device 102 to reboot itself; UpdateFirmwareCommand, which issues a command requesting the RFID device 102 apply a specific firmware version; GetConfigValuesCommand, which issues a command requesting the RFID device 102 to send back the configuration parameters of the RFID device 102; SetConfigValuesCommand, which issues a command requesting the RFID device 102 to update one or more of its configuration parameters, with the Cloud device API validating that each of the parameters exist and are of the correct type via the device definition before accepting the request; GetEPCListCommand, which issues a command requesting the RFID device 102 perform an RFID scan and return the results of the scan to the Cloud network 104; ReadTagDataCommand, which issues a command requesting the RFID device 102 perform an RFID scan and return all data stored on an RFID tag 117, such as, for example, TID, EPC, and data stored in the user memory area of the RFID tag 117; WriteTagDataCommand, which issues a command requesting the RFID device 102 perform a write to one or more RFID tags 117, such as, for example, writing data relating to an Electronic Product Code (EPC) or custom data to be stored in the user memory area of the RFID tag 117; LockCommand, which issues a command requesting the RFID device 102 to issue a "Lock" command to one or more RFID tags 117, with the "Lock" so that data can no longer be written to the RFID tag(s) 117; UnlockCommand, which issues a command requesting the RFID device 102 to issue an "Unlock" command to one or more RFID tags 117, with the "Unlock" command unlocking an RFID tag 117 to allow for data to once again be written to the RFID tag 117; and, KillCommand, which issues a command requesting the RFID device 102 to issue a "Kill" command that makes an RFID tag 117 no longer respond to RFID commands.

The Cloud application API 103 provides a standard interface for issuing commands to configure a Cloud application 111a or 111b. Configuration commands the Cloud application API 103 may provide includes, but is not limited, to: AddLogicalDevice, which represents a physical RFID device 102 that the runtime system 110 uses to route commands, with a logical device being tied to a specific device definition to further instruct the runtime system 110 how to treat the RFID device 102; RemoveLogicalDevice, which removes the setup and routes for a RFID device 102 in the runtime system; GetConfiguration, which returns the runtime system 110 settings for the Cloud application as well as a list of all configured logical devices; GetDeviceDefinitions, which returns a list of all available device configurations the RFID system 100 supports, and in which a logical device would be added with a reference to its correct device definition; AddPolicy, which creates a policy in the runtime system 110 that is designed to manage the settings for a specific RFID device 102; RemovePolicy, which removes a specific policy from the runtime system 110; GetPolicies, which returns a list of all policies for the endpoint application; AddDeviceToPolicy, which informs the runtime system 100 that an RFID device 102 should be using the parameter values defined in the policy in conjunction with any overrides for its settings; and RemoveDeviceFromPolicy, which informs the runtime system 110 that the settings of an RFID device 102 that are defined in the policy need to be monitored for compliance.

The RFID system 100 also publishes event data from RFID devices 102 or derived events to all endpoint applications 106. As previously mentioned, events are published and either delivered directly to the endpoints application 106 through the subscription service 112 or pushed to a queue that the endpoint application 106 can then query from when needed. Communications sent to the queue of the queuing service 114 may have a variety of different formats, such as, for example, being sent in JavaScript Object Notation (JSON) or XML format, or being formatted text, among others.

Events may be generated by either the RFID device 102 or the Cloud application API 103. Such events may include, but are not limited to: AggregateEvent, which provides a list of RFID tags 117 that have either been moved since the last RFID read or are no longer present, and which may provide context to the present/not present, movement and directionality; ObjectEvent, which provides a list of RFID tags 117 the RFID device 102 scanned; HeartbeatEvent, which is a message generated by the RFID device 102 indicating it is actively communicating with the Cloud network 104; SensorReadingEvent, which is a message generated by the RFID device 102 that indicates non-RFID data, such as, for example, temperature or humidity, among other data; LogEntryEvent, which is a message generated by the RFID device 102 for health and diagnostic purposes, and which may include a severity level to better prioritize the message; CommandQueuedEvent, which is generated by Cloud application API 103 to indicate a command has been issued for an RFID device 102; CommandCompletionEvent, which is generated by the RFID device 102 indicating the requested CommandQueuedEvent has been completed either successfully or unsuccessfully; LogicalDeviceAddedEvent, which is generated by the Cloud application API indicating a new LogicalDevice was added to the Cloud application; LogicalDeviceRemovedEvent, which is generated by the Cloud application API 103 indicating a LogicalDevice was removed from the Cloud application; DeviceFailureEvent, which is generated by the Cloud application API 103 indicating a LogicalDevice has been placed into a failure state in Jetstream; and, DeviceRestoreEvent, which is generated by the Cloud application API 103 indicating a LogicalDevice has been removed from a failure state in the Cloud application API 103.

Additionally, depending on the need, endpoint applications 106 may be built to interface with an event, a command, or configuration interfaces. Moreover, different endpoint 106 applications may consume the same data. For example, an enterprise resource planning (ERP) system, such as Systemanalyse and Programmentwicklung ("System Analysis and Program Development") (SAP), can automatically be configured to add RFID devices 102 as inventory locations. When AggregateEvents are received, SAP can then collect that data and either move the inventory automatically to a new warehouse/stocking location or even bill a customer. Further, for example, another endpoint application 106 may be a web based device health and management application. Other applications may include, for example, a vendor managed inventory application, point of sale application, field inventory tracking application, or an asset management application, among others.

According to certain embodiments in which the Cloud application API 103 is ReST based, the endpoint application 106 may call the Cloud network 104 using cURL, or an equivalent, to retrieve data for the endpoint application 106. However, according to other embodiments, an open source SDK may be created that allows the Cloud network 104 to be worked with as though the Cloud network 104 were an object. Calls to the Cloud network 104 could then be built and validated before a ReST call from the Cloud application API 103 is made to the endpoint application 106. Similarly, the XML responses can be returned as objects and acted upon more easily.

According to certain embodiments, messages in a queue of the queuing service 114 of a Cloud application 111*a*, 111*b* may be stored as a JavaScript Object Notation (JSON). However, the JSON standard may not be handy for applications outside of JavaScript. Thus, according to certain embodiments, a software development kit (SDK) takes a JSON message and converts the message into an object for use in the endpoint application 106. The SDK can be created for any language that supports calling a HTTP/S endpoint, such as, for example, C#, Java, PHP, Ruby, or other similar language.

Figure 2:
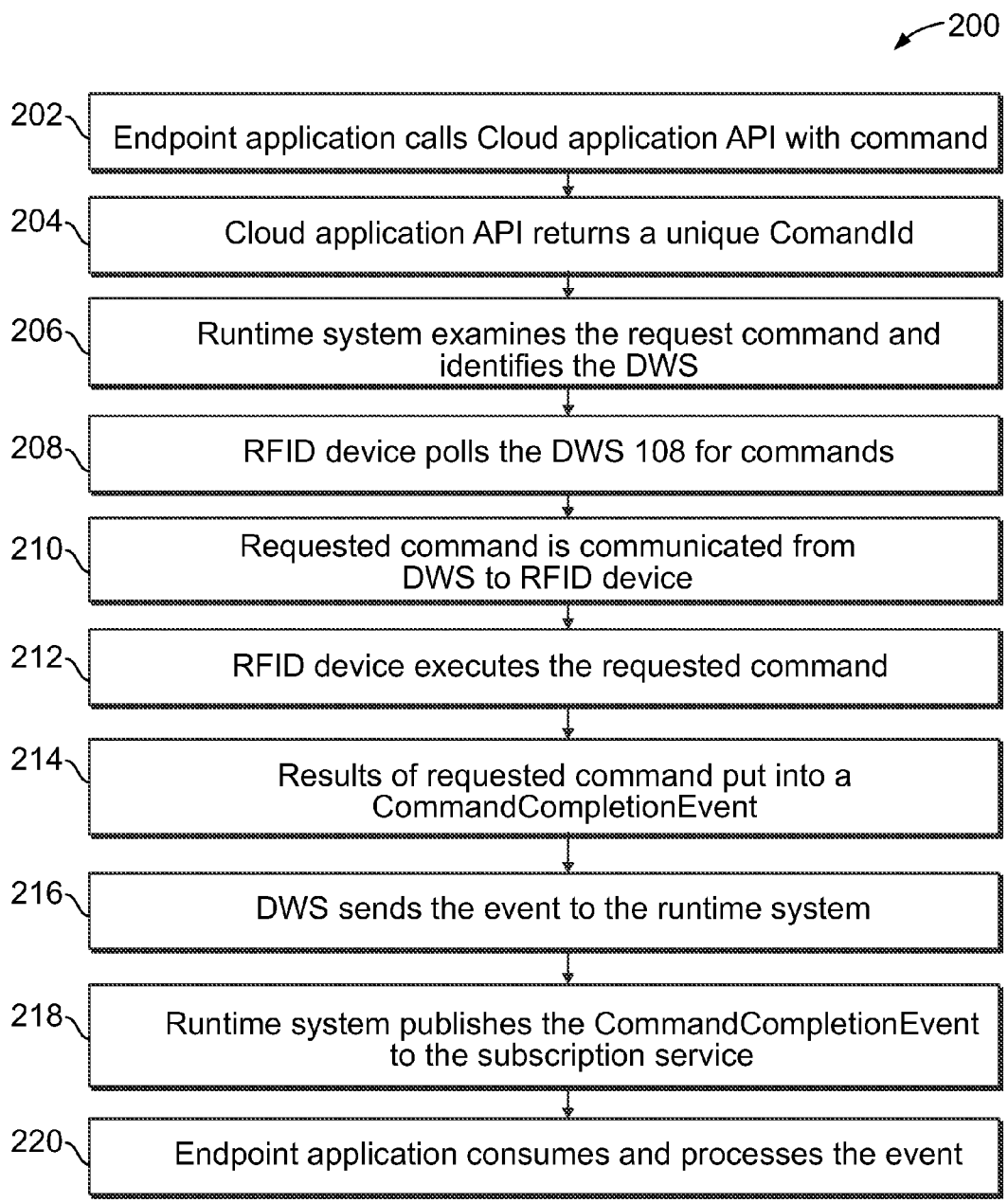
FIG. 2 illustrates a flow chart, according to certain embodiments, demonstrating the data flow and processes the RFID system uses to execute a demand on an RFID device for commands.

FIG. 2 illustrates a flow chart demonstrating the data flow and processes 200 the RFID system 100 uses to execute a demand on an RFID device 102 for commands according to certain embodiments. At step 202, an endpoint application calls the Cloud application API 103 with a desired, requested command. Again, according to certain embodiments, the Cloud application API 103 may be ReST based. At step 204, the Cloud application API 103 returns a unique ComandId in the CommandQueuedEvent that will identify the results on the CommandCompletionEvent. At step 206, the runtime system 100 examines the request command and identifies the DWS 108 that is communication with the RFID device(s) 102 that are subject to the command, and queues the requested command appropriately. At step 208, the RFID device 102 polls the DWS 108 for any requested commands. At step 210, the requested command is communicated from the DWS 108 to the RFID device 102. At step 212, the RFID device 102 executes the requested command, which may result in the generation results that reflect the execution of that command. At step 214, the results of the requested command are put into a CommandCompletionEvent with the CommandId and communicated to the DWS 108. At step 216, the DWS 108 sends the event, via the CommandCompletionEvent, to the runtime system 110. Then, at step 218, the runtime system 110 publishes the CommandCompletionEvent to the subscription service 112 for all subscribed SNS application users. And at step 220, the endpoint application 106 consumes and processes the event.

Figure 3:
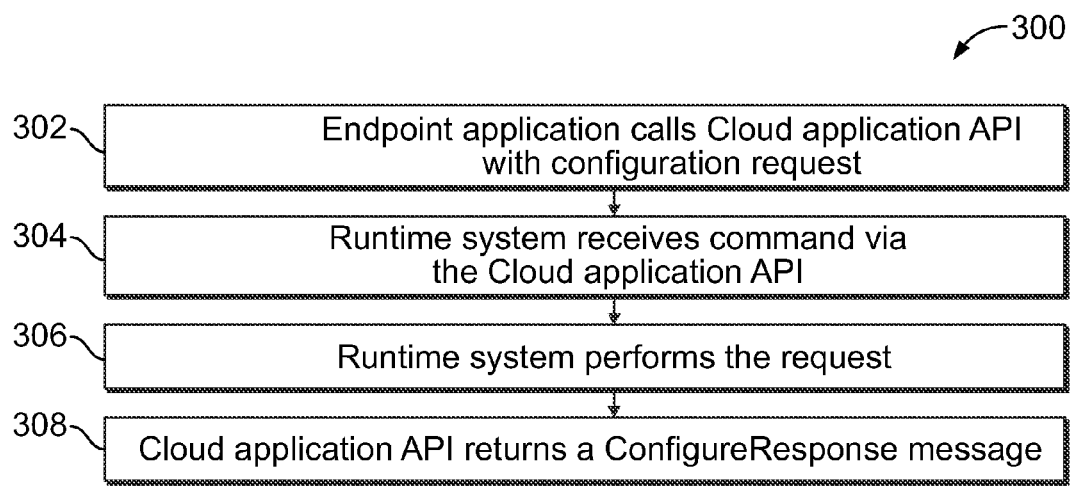
FIG. 3 illustrates a flow chart, according to certain embodiments, demonstrating processes the RFID system uses to update or manage the configuration of an endpoint application.

FIG. 3 illustrates a flow chart demonstrating processes 300 the RFID system 100 uses to update or manage the configuration of the Cloud application 111*a*, 111*b*. At 302, the endpoint application 106 calls the Cloud application API 103 with a configuration request. At step 304, the runtime system 100 receives the command via the Cloud application API 103. At step 306, the runtime system 110 performs the request. At step 308, the Cloud application API 103 returns a ConfigureResponse message, in the response to the configuration request, to the endpoint application 106 that indicates the success or failure of the command request, and which may also include appropriate details.

Figure 4:
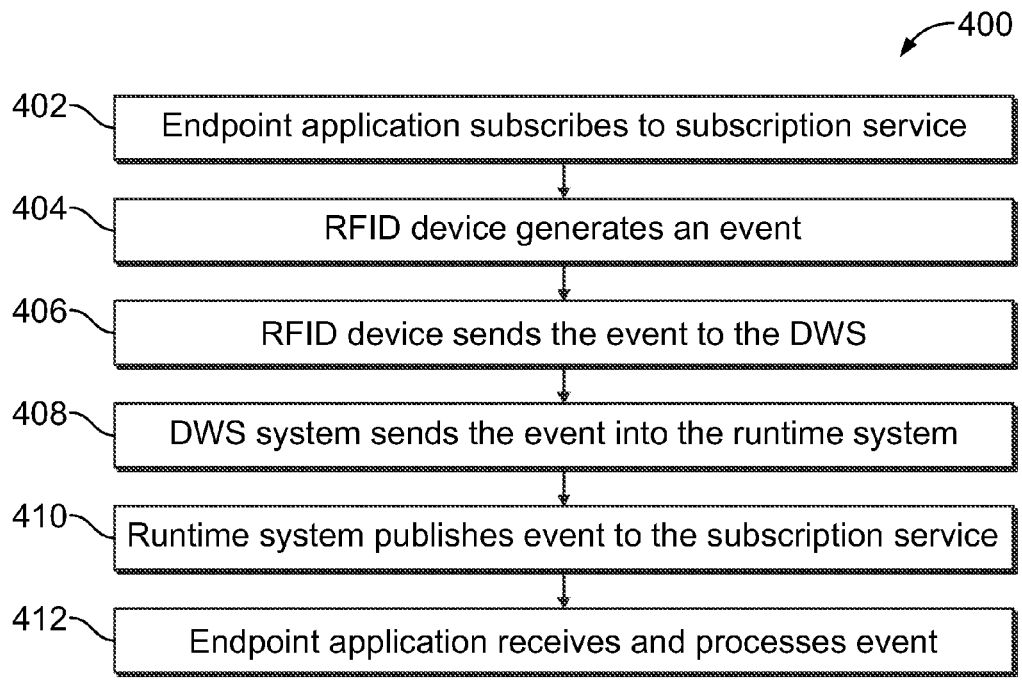
FIG. 4 illustrates a flow chart, according to certain embodiments, demonstrating processes relating to the receipt of events from the RFID device or the RFID system.

FIG. 4 illustrates a flow chart demonstrating processes 400 relating to the receipt of events from the RFID device 102 or the RFID system 100. At step 402, the endpoint application 106 subscribes to the subscription service 112, which will allow the endpoint application 106 to receive data relating to the RFID device 102. As previously mentioned, data may also be published directly to the RFID device 102 or be published in a queue of a queuing service 114. At step 404, the RFID device 102 generates an event, such as an AggregateEvent or LogEntryEvent. At step 406, the RFID device 102 sends the event to the DWS 108, such as, for example, over a SSL connection using a ReST command. At step 408, the DWS system 108 sends the event into the runtime system 110. Then, at step 410, the runtime system 110 publishes the event to all endpoint applications 106 that have subscribed to the subscription service 112 that receives the event. Once the event is with the subscription service, then at step 412, the endpoint application 105 may directly or indirectly receive and process the event.

According to certain embodiments, the RFID system 100 handles routing of data from RFID devices 102 to the correct endpoint application 106 without analyzing the data, with the possible exception of the endpoint applications 106. However, according to other embodiments, the RFID system 100 may include an event analysis engine 122 that is part of the runtime system 110. The event analysis engine 122 may take information, such as, for example, events, product quantity, time of event and/or changes in data, or a combination thereof, to create new LogEntryEvents. Similarly, a ComandQueuedEvent could automatically be scheduled, if desired. These rules would apply either application wide or based on a device definition of an RFID device 102.

For example, a rule may be set up application wide that monitors the last time a communication was received from an RFID device 102 and have an error condition of four hours. Thus, if an RFID device 102 ceases communication with a DWS 108, after four hours elapse, a LogEntryEvent may be generated indicating the RFID device 102 has not communicated in the last four hours. The LogEntryEvent may then be the basis for dispatching a support person to investigate the reason(s) for a lack of communications from the RFID device 102, such as, for example, the RFID device 102 having lost power. Additionally, for example, a rule may be set up in the device definition for RFID devices 102 for an application that monitors temperature changes over a period of time. Therefore, an RFID device 102 may report its temperature on a regular basis via a SensorReadingEvent. Additionally, the rule may be associated with various indication parameters, such as a rise or drop in temperature in a prescribed time period. Hence, if for example, a door to a freezer containing the RFID device 102 has been left open, causing the temperature of the RFID device 102 to rise, such as 10 degrees in 5 minutes, a LogEntryEvent may be generated indicating the warming trend. A support person could then be dispatched to close the door or remove the items if warranted. According to another example, a rule may be created application wide that monitors for an error condition, such as, for example, a software error. Thus, when an RFID device 102 is communicating but is sending in LogEntryEvents indicating a software problem, a ResetCommand may be triggered for the RFID device 102 to reboot to try and correct the software problem.

According to certain embodiments, communication between the RFID device 102 and the Cloud network 104 may be intermittent, such as, for example, occurring only at the specific times that the RFID device 102 seeks to communicate with the Cloud network 104. Thus, under such an example, the RFID device 102 may not receive a CommandQueuedEvent that has been generated by Cloud network 104 until the RFID device 102 communicates with the Cloud Network 104. In such situations, a relatively significant amount of time may elapse before the command is issued to the RFID device 102. However, to avoid such situations, according to certain embodiments, a communication channel that allows for bi-directional communications may be continuously open between the RFID device 102 and the Cloud Network 104. For example, when an RFID device 102 connects to a DWS 108, the DWS 108 would respond with options including the option of establishing a bi-directional communication channel between the RFID device 102 and the DWS 108. The RFID device 102 and the DWS 108 may then negotiate to see if such a connection could be established. Such negotiations may include latency and throughput to verify a stable connection could be established.

Once the bi-directional communication channel is established, events from the RFID device 102 may be sent to the Cloud network 104. Likewise, when the DWS 108 receives a command, the command would be sent directly to the RFID device 102 through the bi-directional channel for execution by the RFID device 102. The response from the RFID device 102 may then be returned to the DWS 108 on the acknowledgement of the command, or in instances in which the command will take a relatively long duration, the command would be returned to the DWS 108 when completed without having to establish outgoing communications. Further, in the event a bi-directional communication channel is established and the connection fails or drops, each side, namely the RFID device 102 and the DWS 108, would continue to operate in the RFID device 102 initiated connections mode with response back of queued commands.

According to certain embodiments, the bi-directional communication channel relies on technology similar to web sockets technology. For instance, the initial communication between the RFID device 102 and the DWS 108 may be negotiated over TCP ports 80/443, and eventually moved to a long lived TCP port, which may be firewall friendly. According to such embodiments, since the upgraded socket has to be negotiated, the firewall is checked for compatibility as the socket is being set up.

With respect to RFID tag 117 validation, generally the identification information of an RFID tag 117 is typically only useful in conjunction with a database that ties the RFID tag 117 to the associated item. In some instances, this identification data may also be written to the user memory of the RFID tag 117. However, there are cases where the item associate with the RFID device 102 needs to be validated for its authenticity. According to certain embodiments of the present invention, such authenticity may be validated by using an interface to look up RFID tag 117 data from various external sources or via a built in tag registration service.

According to embodiments which utilize the built-in tag registration service, the Cloud device API would add functions to add RFID tag 117 and item information to a database 116 on the Cloud network 104 that would be managed through the Cloud device API. According to certain embodiments, the database 116 would be set up to have EPC and/or TID as indexes with a reference to the manufacturer of the product associated with the RFID tag 117. The database 116 may also contain a variety of information or fields, such as, for example, expiration date, lot, and/or batch number. Additionally, according to certain embodiments, such fields may be set-up in a database 116 that is separately based on the manufacturer. However, rather than being stored in a database 116 on the Cloud network 104, according to certain embodiments the database 116 may be outside of the Cloud network 104 and accessible by a gateway service.

According to certain embodiments, a separate, non-management API with read only access is available to any endpoint application 106. Alternatively, for example, the API may also be accessed by anonymous users for those not registered in the runtime system 110. The request for this read only data from the RFID device 102 may originate from the endpoint application 106 or the associated user of the endpoint application 106. According to certain embodiments, the request may accept an EPC and/or a TID as the required bits of information for which data is to be returned. Data stored on the runtime system 110 relevant to the request may then be returned to the endpoint application 106, such as, for example, via a ReST based Cloud application API 103. The data can be displayed back to the endpoint application 106 as supplemental data. Similarly, for RFID tags 117 that have the same data written to the RFID tag 117, the RFID tag 117 may then be authenticated as valid, such as, for example, by validation through a comparison of certain information on the RFID tag 117 with information stored in the runtime system 110, such as, for example, a digital signature, expiration date, batch number, and/or lot number, among other information.

According to certain embodiments, to augment the built in tag registration service, a serialization option for the RFID system 100 may be provided. For example, RFID tags 117 may, or may not, initially be provided by a manufacturer with an EPC programmed on the RFID tag 117. However, this EPC may be inaccurate and/or not unique. Therefore, a request may be generated into a sterilization service offered by the runtime system 110 for a new identifier for the RFID tag 117. The identifier returned from the serialization service may be unique so as to provide uniqueness for that identifier over all Cloud applications 111a, 111b utilizing the service offered by the application 111a, 111b. This may allow for RFID tags 117 to have context across multiple Cloud applications 111a, 111b without compromising application security.

Although embodiments of the invention have been described as communicating information across the internet, the RFID system 100 may also be configured to run on a local LAN. Such configurations may prevent data in the communications during operation of the of the RFID system 100 from passing outside an end user's organization. For such configurations, the DWS 108 and runtime system 110 may be packaged into pieces of software to be run on servers on premise of the end user. Although the RFID system 100 would not be operating across the internet, the Cloud device API, which would be a local network API, would continue to be in communication with RFID devices 102 using the local area network. RFID devices 102 may therefore be configured to point to the local instance of the DWS 108, which may require the RFID device 102 have a configuration that indicates the network location of the DWS 108. Similarly, the endpoint application 106 would also use a local application API similar to the Cloud application API 103 that is on premise instead of through the Cloud, which may also require that the endpoint application 106 have a configuration that indicates where the network location of the appropriate API endpoint and queue.

Further, certain embodiments have been described as using a queuing service 114 through commands to the Cloud application API 103, such as ReST commands, with the results being returned via a publishing service 107, which may allow for a disconnected request-response view. Alternatively, a bidirectional communications channel may be established between the runtime system 110 and the endpoint application 106 that may prevent drops in communications when the endpoint application 106 connects to the runtime system 110 via the Cloud network API. Such a bi-directional communications channel may be more in line with client-server communication structures.

For example, when an endpoint application 106 connects to the Cloud application API 103, an option would be returned to the endpoint application 106 to upgrade to a bidirectional communications channel. The runtime system 110 and the endpoint application 106 then would negotiate to see whether such a bi-directional connection could be established. This negotiation may consider a variety of different factors, such as, for example, latency and throughput, to verify a stable connection could be established.

Once the bi-directional communication channel is established, commands are sent to the runtime system 110 as previously discussed. Events from RFID devices 102 are pushed relatively directly into the endpoint application 106. If the RFID device 102 is using a bi-directional communications channel to communication with the runtime system 110, as previously discussed, events may be sent to the endpoint application 106 in near real-time, typically with the delay being associated with network latency and the runtime routing. Similarly, commands issued by the endpoint application 106 to the RFID device 102 are received by the RFID device 102 in near real time, with delay again typically being attributed to network latency and the runtime routing. In the event a bi-directional communications channel is established, and the connection fails or drops, the endpoint application 106 would return to receiving events from the message routing and publishing service 107 via the subscription service 112 or the queuing service 114. The endpoint application 102 would then be able to start the process over to reestablish the bidirectional communication channel.

Further, in the event a bi-directional communication channel is established with some endpoint applications 106, as the each network application is multi-tenant, the runtime system 110 may need to maintain a list of currently connected endpoint applications 106. Those endpoint applications 106 that are not actively connected to the Cloud network 104 may still have messages passed into the subscription service 112 or queuing service 114 via the publishing service 107 of the runtime system 110. For those endpoint applications 106 that are actively connected, the message would be pushed down the open bi-directional communication channel and not sent out for publishing for that user. To further the client-server relationship, when application-to-device is running in bi-directional mode, commands being executed against the RFID device 102 would have the results returned in the acknowledgement to the endpoint application 106.

The invention claimed is:

1. A radio frequency identification system comprising:
one or more radio frequency identification devices coupled to a cloud network; and
one or more endpoint applications coupled to the cloud network,
wherein the cloud network includes a runtime system, a plurality of web servers, and one or more cloud applications, wherein the one or more cloud applications are not part of the runtime system, wherein each cloud application has its own subscription service and queuing service, wherein the runtime system has an application protocol interface configured to facilitate communications between the one or more endpoint applications and the runtime system through the one or more cloud applications, wherein the runtime system is configured to associate each radio frequency identification device with only one cloud application of the one or more cloud applications, wherein data flow does not transverse multiple cloud applications of the one or more cloud applications, wherein the runtime system is configured to generate device definitions for the one or more radio frequency identification devices and to use the device definitions to validate commands or requests issued to the one or more radio identification devices, wherein the cloud network includes a device application protocol interface configured to facilitate communications over the internet between the plurality of web servers and the one or more radio frequency identification devices, and wherein the one or more cloud applications are configured to create a tenancy on the runtime system for the one or more endpoint applications.

2. The radio frequency identification system of claim 1, wherein the one or more radio frequency identification devices each include an agent configured to interact with the device application protocol interface, the agent also being configured to push data from the one or more radio frequency identification devices onto the cloud network.

3. The radio frequency identification system of claim 2, wherein the data includes an event data that the agent generates, the agent being configured to push the event data onto the network as the event data becomes available.

4. The radio frequency identification system of claim 3, wherein the agent is configured to push data from a radio frequency identification tag onto the cloud network.

5. The radio frequency identification system of claim 4, wherein the agent is configured to manage firmware or RFID device health of the associated one or more radio frequency identification devices.

6. The radio frequency identification system of claim 3, wherein the agent includes an access key, and wherein the cloud network is configured to validate the authenticity of the access key before the cloud network provides data from the agent to one of the one or more cloud applications.

7. The radio frequency identification system of claim 3, wherein each subscription service is configured to publish data received by the cloud network for access by the one or more endpoint applications.

8. The radio frequency identification system of claim 7, wherein each queuing service is configured to maintain the data received by the cloud network in a queue for later access by the one or more endpoint applications.

9. The radio frequency identification system of claim 1, wherein the device application protocol interface resides at one or more of the plurality of web servers.

10. The radio frequency identification system of claim 9, wherein the one or more radio frequency identification devices are configured to communicate with the runtime system of the cloud network through the device application protocol interface residing at the one or more of the plurality of web servers.

11. The radio frequency identification system of claim 1, wherein a connection does not need to be established between the one or more radio frequency identification devices and the one or more endpoint applications for communications between the one or more radio frequency indemnification devices and the one or more endpoint applications.

12. A method for operating a radio frequency identification system comprising:
delivering a command from an endpoint application to a runtime system through a cloud application and an application protocol interface of the runtime system, wherein the runtime system and the cloud application are part of a cloud network, wherein the cloud application is not part of the runtime system, wherein the cloud application has its own subscription service and queuing service, wherein the endpoint application is coupled to the cloud network through the cloud application, wherein data flow does not transverse multiple cloud applications;
running a security object application on the runtime system such that each radio frequency identification device belongs to only one cloud application;
identifying a radio frequency identification device associated with the command, wherein the radio frequency identification device is coupled to the cloud network;
generating a device definition by the runtime system;
validating, by the runtime system, the command using the device definition;
delivering the command from the runtime system to a server that communicates with an agent of the radio identification frequency device, wherein the server is part of the cloud network;
queuing in a queue the command delivered to the server;
polling, by the agent of the radio frequency identification device, the queue for the command; and
delivering the command from the queue to the agent of the radio frequency device.

13. The method of claim 12, further including the step of transmitting, by the agent, an event data generated after the completion of the command by the agent.

14. The method of claim 12, wherein the command is delivered to the RFID device over the internet.

15. The method of claim 14, further including the step of validating, by the cloud network, the authenticity of an access key of the agent before delivering the command to the agent.

16. The method of claim 14, further including selecting the server by the runtime system according to a particular kind of data being delivered.

17. The method of claim 15, further including the step of validating, by the runtime system, an access key of the endpoint application.

18. The method of claim 15, wherein the step of validating the authenticity of the access key of the agent is performed before the server accepts receipt of the event data.

19. The method of claim 18, further including the step of delivering an acknowledgement receipt to the agent after the authenticity of the access key has been validated.

20. The method of claim 19, including the step of removing, by the agent, the event data from the radio frequency identification device after the acknowledgement receipt has been delivered to the agent.

21. The method of claim 17, further including the step of delivering an event data to the endpoint application.

22. The method of claim 21, wherein the step of delivering the event data to the endpoint application includes publishing the event data using the subscription service for delivery of the event data to the endpoint application.

23. The method of claim 21, wherein the step of delivering the event data to the endpoint application includes delivering the event data to the queuing service configured to maintain the event data in a queue of the queuing service for later access by the endpoint application.

24. The method of claim 23, further including the step of establishing a bidirectional communication channel between the agent of the radio frequency identification device and the server.

25. The method of claim 23, further including the step of establishing a bidirectional communication channel between the endpoint application and the runtime system.

26. The method of claim 12, wherein a cloud device application protocol interface of the cloud network resides at the server.

27. The method of claim 26, wherein the runtime system of the cloud network is configured to communicate with the radio frequency identification device through the cloud device application protocol interface residing at the server of the cloud network.

* * * * *